(12) United States Patent
Chaves et al.

(10) Patent No.: US 7,798,675 B2
(45) Date of Patent: Sep. 21, 2010

(54) LED LUMINANCE-ENHANCEMENT AND COLOR-MIXING BY ROTATIONALLY MULTIPLEXED BEAM-COMBINING

(75) Inventors: Julio Cesar Chaves, Madrid (ES); Juan Carlos Minano, Madrid (ES); William A. Parkyn, Jr., Lomita, CA (US); Waqidi Falicoff, Stevenson Ranch, CA (US); Pablo Benitez, Madrid (ES); Roberto Alvarez, Glendale, CA (US); Oliver Dross, Cologne (DE)

(73) Assignee: Light Prescriptions Innovators, LLC, Altadena, CA (US)

( * ) Notice: Subject to any disclaimer, the term of this patent is extended or adjusted under 35 U.S.C. 154(b) by 64 days.

(21) Appl. No.: 12/369,661

(22) Filed: Feb. 11, 2009

(65) Prior Publication Data
US 2010/0033946 A1 Feb. 11, 2010

Related U.S. Application Data (63) Continuation of application No. PCT/US2007/075780, filed on Aug. 13, 2007.

(60) Provisional application No. 60/822,209, filed on Aug. 11, 2006.

(51) Int. Cl.
*F21V 33/00* (2006.01)
(52) U.S. Cl. ............... 362/281; 362/280; 362/282; 362/346; 362/800
(58) Field of Classification Search ......... 362/280–284, 362/277, 297, 304, 322–324, 341, 346, 347, 362/349, 800, 35, 235, 247
See application file for complete search history.

(56) References Cited

U.S. PATENT DOCUMENTS 1,282,051 A 10/1918 Doman
1,399,973 A 12/1921 Limpert (Continued)

FOREIGN PATENT DOCUMENTS

EP 0450560 A2 10/1991

(Continued)

OTHER PUBLICATIONS

*International Search Report*, PCT/US03/38024, W004051223, mail date Nov. 10, 2004.

(Continued)

*Primary Examiner*—Laura Tso
(74) *Attorney, Agent, or Firm*—Thomas F. Lebens; Sinsheimer Juhnke Lebens & McIvor, LLP (57) ABSTRACT

The present embodiments provide methods and systems for use in providing enhanced illumination. Some embodiments include at least two light sources and one or more smoothly rotating wheels, where the one or more wheels comprises at least one mirror sector, the circumferential portion of the mirror sector is the inverse of the number of said sources, a first source of the sources is so disposed that the mirror sector reflects light from the first source into a common output path, where the first source pulsing such that a duty cycle of the first source corresponds to a time the mirror sector reflects light from the first source into the common output path.

9 Claims, 5 Drawing Sheets

U.S. PATENT DOCUMENTS

| | | |
|---|---|---|
| 1,977,689 A | 10/1934 | Muller |
| 2,908,197 A | 10/1959 | Wells et al. |
| 3,746,853 A | 7/1973 | Kosman et al. |
| 3,760,237 A | 9/1973 | Jaffe |
| 3,774,021 A | 11/1973 | Johnson |
| 4,114,592 A | 9/1978 | Winston |
| 4,188,111 A | 2/1980 | Marvin |
| 4,192,994 A | 3/1980 | Kastner |
| 4,211,955 A | 7/1980 | Ray |
| 4,337,759 A | 7/1982 | Popovich et al. |
| 4,342,908 A | 8/1982 | Henningsen et al. |
| 4,384,769 A | 5/1983 | Brei et al. |
| 4,464,707 A | 8/1984 | Forrest |
| 4,638,343 A | 1/1987 | Althaus et al. |
| 4,675,725 A | 6/1987 | Parkyn |
| 4,698,730 A | 10/1987 | Sakai et al. |
| 4,709,312 A | 11/1987 | Heinisch et al. |
| 4,727,289 A | 2/1988 | Uchida |
| 4,727,457 A | 2/1988 | Thillays |
| 4,868,723 A | 9/1989 | Kobayashi |
| 4,920,404 A | 4/1990 | Shrimali et al. |
| 5,055,892 A | 10/1991 | Gardner et al. |
| 5,140,220 A | 8/1992 | Hasegawa |
| 5,335,157 A | 8/1994 | Lyons |
| 5,343,330 A | 8/1994 | Hoffman et al. |
| 5,404,282 A | 4/1995 | Klinke et al. |
| 5,404,869 A | 4/1995 | Parkyn, Jr. et al. |
| 5,438,453 A | 8/1995 | Kuga |
| 5,452,190 A | 9/1995 | Priesemuth |
| 5,453,877 A | 9/1995 | Gerbe et al. |
| 5,471,371 A | 11/1995 | Koppolu et al. |
| 5,528,474 A | 6/1996 | Roney et al. |
| 5,557,471 A | 9/1996 | Fernandez |
| 5,577,492 A | 11/1996 | Parkyn et al. |
| 5,580,142 A | 12/1996 | Kurematsu et al. |
| 5,600,487 A | 2/1997 | Kiyomoto et al. |
| 5,608,290 A | 3/1997 | Hutchisson et al. |
| 5,613,769 A | 3/1997 | Parkyn et al. |
| 5,655,830 A | 8/1997 | Ruskouski |
| 5,655,832 A | 8/1997 | Pelka et al. |
| 5,676,453 A | 10/1997 | Parkyn, Jr. et al. |
| 5,699,186 A | 12/1997 | Richard |
| 5,757,557 A | 5/1998 | Medvedev |
| 5,806,955 A | 9/1998 | Parkyn, Jr. et al. |
| 5,813,743 A | 9/1998 | Naka |
| 5,839,812 A | 11/1998 | Ge et al. |
| 5,865,529 A | 2/1999 | Yan |
| 5,894,195 A | 4/1999 | McDermott |
| 5,894,196 A | 4/1999 | McDermott |
| 5,897,201 A | 4/1999 | Simon |
| 5,898,267 A | 4/1999 | McDermott |
| 5,898,809 A | 4/1999 | Taboada et al. |
| 5,924,788 A | 7/1999 | Parkyn |
| 5,926,320 A | 7/1999 | Parkyn et al. |
| 5,966,250 A | 10/1999 | Shimizu |
| 6,019,493 A | 2/2000 | Kuo et al. |
| 6,030,099 A | 2/2000 | McDermott |
| 6,044,196 A | 3/2000 | Winston et al. |
| 6,048,083 A | 4/2000 | McDermott |
| 6,055,108 A | 4/2000 | Dreyer |
| 6,097,549 A | 8/2000 | Jenkins et al. |
| 6,139,166 A | 10/2000 | Marshall et al. |
| 6,166,860 A | 12/2000 | Medvedev et al. |
| 6,166,866 A | 12/2000 | Kimura et al. |
| 6,177,761 B1 | 1/2001 | Pelka et al. |
| 6,181,476 B1 | 1/2001 | Medvedev et al. |
| 6,201,229 B1 | 3/2001 | Tawa et al. |
| 6,222,623 B1 | 4/2001 | Wetherell |
| 6,252,636 B1 | 6/2001 | Bartlett |
| 6,268,963 B1 | 7/2001 | Akiyama |
| 6,273,596 B1 | 8/2001 | Parkyn |
| 6,282,821 B1 | 9/2001 | Freier |
| 6,296,376 B1 | 10/2001 | Kondo et al. |
| 6,301,064 B1 | 10/2001 | Araki et al. |
| 6,350,041 B1 | 2/2002 | Tarsa et al. |
| 6,356,700 B1 | 3/2002 | Strobel |
| 6,361,190 B1 | 3/2002 | McDermott |
| 6,450,661 B1 | 9/2002 | Okumura |
| 6,473,554 B1 | 10/2002 | Pelka et al. |
| 6,483,976 B2 | 11/2002 | Shie et al. |
| 6,488,392 B1 | 12/2002 | Lu |
| 6,502,964 B1 | 1/2003 | Simon |
| 6,504,301 B1 | 1/2003 | Lowery |
| 6,536,923 B1 | 3/2003 | Merz |
| 6,547,400 B1 | 4/2003 | Yokoyama |
| 6,547,423 B2 | 4/2003 | Marshall et al. |
| 6,554,455 B2 | 4/2003 | Perlo et al. |
| 6,560,038 B1 | 5/2003 | Parkyn et al. |
| 6,578,989 B2 | 6/2003 | Osumi et al. |
| 6,580,228 B1 | 6/2003 | Chen et al. |
| 6,582,103 B1 | 6/2003 | Popovich et al. |
| 6,598,998 B2 | 7/2003 | West et al. |
| 6,603,243 B2 | 8/2003 | Parkyn et al. |
| 6,607,286 B2 | 8/2003 | West et al. |
| 6,616,287 B2 | 9/2003 | Sekita et al. |
| 6,621,222 B1 | 9/2003 | Hong |
| 6,637,924 B2 | 10/2003 | Pelka et al. |
| 6,639,733 B2 | 10/2003 | Minano et al. |
| 6,641,287 B2 | 11/2003 | Suehiro |
| 6,646,813 B2 | 11/2003 | Falicoff |
| 6,647,199 B1 | 11/2003 | Pelka et al. |
| 6,649,939 B1 | 11/2003 | Wirth |
| 6,668,820 B2 | 12/2003 | Cohen et al. |
| 6,674,096 B2 | 1/2004 | Sommers |
| 6,679,621 B2 | 1/2004 | West et al. |
| 6,688,758 B2 | 2/2004 | Thibault |
| 6,692,136 B2 | 2/2004 | Marshall et al. |
| 6,729,746 B2 | 5/2004 | Suehiro et al. |
| 6,744,196 B1 | 6/2004 | Jeon |
| 6,769,772 B2 | 8/2004 | Roddy et al. |
| 6,773,143 B2 | 8/2004 | Chang |
| 6,786,625 B2 | 9/2004 | Wesson |
| 6,796,698 B2 | 9/2004 | Sommers et al. |
| 6,803,607 B1 | 10/2004 | Chan et al. |
| 6,811,277 B2 | 11/2004 | Amano |
| 6,830,359 B2 | 12/2004 | Fleury |
| 6,846,100 B2 | 1/2005 | Imazeki et al. |
| 6,848,820 B2 | 2/2005 | Natsume |
| 6,863,402 B2 | 3/2005 | Roddy et al. |
| 6,882,379 B1 | 4/2005 | Yokoyama et al. |
| 6,886,962 B2 | 5/2005 | Suehiro |
| 6,896,381 B2 | 5/2005 | Benitez |
| 6,924,943 B2 | 8/2005 | Minano et al. |
| 6,926,435 B2 | 8/2005 | Li |
| 6,948,836 B2 | 9/2005 | Ishida et al. |
| 6,953,265 B2 | 10/2005 | Suehiro et al. |
| 6,988,813 B2 | 1/2006 | Hoelen et al. |
| 6,997,587 B2 | 2/2006 | Albou |
| 7,006,306 B2 | 2/2006 | Falicoff et al. |
| 7,021,797 B2 | 4/2006 | Minano |
| 7,042,655 B2 | 5/2006 | Sun |
| 7,144,121 B2 | 12/2006 | Minano et al. |
| 7,152,985 B2 | 12/2006 | Benitez et al. |
| 7,181,378 B2 | 2/2007 | Benitez et al. |
| 7,192,173 B2 | 3/2007 | Vaughnn |
| 7,347,599 B2 | 3/2008 | Minano et al. |
| 7,377,671 B2 | 5/2008 | Minano et al. |
| 7,460,985 B2 | 12/2008 | Benitez et al. |
| 7,520,614 B2 | 4/2009 | Joos et al. |
| 2002/0034012 A1 | 3/2002 | Santoro et al. |
| 2002/0041499 A1 | 4/2002 | Pederson |
| 2002/0080623 A1 | 6/2002 | Pashley |
| 2002/0163808 A1 | 11/2002 | West et al. |
| 2002/0185651 A1 | 12/2002 | Sommers |

| | | | |
|---|---|---|---|
| 2003/0002281 A1 | 1/2003 | Suehiro | |
| 2003/0076034 A1 | 4/2003 | Marshall | |
| 2004/0031517 A1 | 2/2004 | Bareis | |
| 2004/0080938 A1 | 4/2004 | Holman | |
| 2004/0125614 A1 | 7/2004 | Ishida et al. | |
| 2004/0130907 A1 | 7/2004 | Albou | |
| 2004/0145910 A1 | 7/2004 | Lisowski | |
| 2004/0190304 A1 | 9/2004 | Sugimoto et al. | |
| 2004/0218390 A1 | 11/2004 | Holman et al. | |
| 2004/0228131 A1 | 11/2004 | Minano et al. | |
| 2004/0246697 A1 | 12/2004 | Yamashita et al. | |
| 2005/0024744 A1 | 2/2005 | Falicoff | |
| 2005/0086032 A1 | 4/2005 | Benitez et al. | |
| 2005/0088758 A1 | 4/2005 | Minano et al. | |
| 2005/0117125 A1 | 6/2005 | Minano et al. | |
| 2005/0129358 A1 | 6/2005 | Minano et al. | |
| 2005/0135095 A1 | 6/2005 | Geissler | |
| 2005/0169002 A1 | 8/2005 | Steen et al. | |
| 2005/0180145 A1 | 8/2005 | Okuwaki | |
| 2005/0200812 A1 | 9/2005 | Sakata et al. | |
| 2005/0219464 A1 | 10/2005 | Yamasaki et al. | |
| 2005/0225988 A1 | 10/2005 | Chavez | |
| 2005/0243570 A1 | 11/2005 | Chaves et al. | |
| 2006/0067078 A1 | 3/2006 | Beeson et al. | |
| 2007/0036512 A1 | 2/2007 | Winston et al. | |

FOREIGN PATENT DOCUMENTS

| | | |
|---|---|---|
| ES | 2142752 | 12/2000 |
| SU | 1282051 A1 | 1/1987 |
| WO | WO-0107828 A1 | 2/2001 |
| WO | WO-01/35128 | 5/2001 |
| WO | WO-01/40702 | 6/2001 |
| WO | WO-03/071352 | 8/2003 |
| WO | WO-03066374 A2 | 8/2003 |
| WO | WO-03066374 A3 | 8/2003 |
| WO | WO-2004007241 A2 | 1/2004 |
| WO | WO 2007/104028 | 9/2007 |

OTHER PUBLICATIONS

*International Search Report*, PCT/US04/16313, WO04104925, mail date Mar. 21, 2005.
*International Search Report*, PCT/US04/24450, WO05012952, mail date Aug. 3, 2005.
International Search Report, PCT/US04/38584, WO2005050710, mail date Jul. 18, 2005.
International Search Report, PCT/US03/38024, WO2004051321, mail date Nov. 10, 2004 Jul. 29, 2004.
International Search Report, PCT/US04/14938, WO04104642, mail date Mar. 1, 2005.
Office Action from U.S. Appl. No. 10/622,874 dated Jun. 3, 2004.
Office action from U.S. Appl. No. 10/461,557 dated Nov. 24, 2004.
Office action from U.S. Appl. No. 10/726,130 dated Jan. 17, 2006.
Office action from U.S. Appl. No. 10/726,130 dated Mar. 24, 2005.
Office action from U.S. Appl. No. 10/269,479 dated Mar. 29, 2004.
Notice of Allowance from U.S. Appl. No. 10/269,479 dated Mar. 29, 2004.
Notice of Allowance from U.S. Appl. No. 10/622,874 dated Jan. 4, 2005.
Notice of Allowance from U.S. Appl. No. 10/461,557 dated Aug. 8, 2005.
Notice of Allowance from U.S. Appl. No. 10/726,130 dated Sep. 7, 2005.
Office Action from U.S. Appl. No. 10/772,088 dated Apr. 24, 2007.
Interview Summary from U.S. Appl. No. 10/772,088 dated Apr. 5, 2007.
Advisory Action from U.S. Appl. No. 10/772,088 dated Dec. 6, 2006.
Office Action from U.S. Appl. No. 10/772,088 dated Sep. 8, 2006.
Office Action from U.S. Appl. No. 10/772,088 dated Feb. 24, 2006.
Office Action from U.S. Appl. No. 10/772,088 dated Dec. 16, 2005.
Notice of Allowance from U.S. Appl. No. 10/779,259 dated Oct. 10, 2006.
Office action from U.S. Appl. No. 10/779,259 dated Feb. 24, 2006.
Office action from U.S. Appl. No. 10/779,259 dated Oct. 6, 2005.
Notice of Allowance from U.S. Appl. No. 10/816,228 dated Sep. 14, 2007.
Office action from U.S. Appl. No. 10/816,228 dated Jun. 12, 2007.
Office action from U.S. Appl. No. 10/816,228 dated Apr. 5, 2007.
Office action from U.S. Appl. No. 10/816,228 dated Dec. 13, 2006.
Notice of Allowance from U.S. Appl. No. 10/903,925 dated Aug. 5, 2005.
Office action from U.S. Appl. No. 10/903,925 dated Jan. 25, 2005.
Office action from U.S. Appl. No. 10/901,919 dated May 8, 2007.
Notice of Allowance from U.S. Appl. No. 10/880,386 dated Jul. 14, 2006.
Office action from U.S. Appl. No. 10/880,386 dated Feb. 28, 2006.
Notice of Allowance from 10/880,386 dated Mar. 1, 2005.
Notice of Allowance from U.S. Appl. No. 10/987,182 dated Apr. 25, 2006.
Office action from U.S. Appl. No. 10/987,182 dated Nov. 3, 2005.
Office action from U.S. Appl. No. 10/987,182 dated Jun. 3, 2005.
Notice of Allowance from U.S. Appl. No. 11/040,506 dated Sep. 20, 2007.
Office action from U.S. Appl. No. 11/040,506 dated Apr. 9, 2007.
Interview Summary from U.S. Appl. No. 10/269,479 dated Mar. 18, 2004.
Office Action from U.S. Appl. No. 10/772,088 dated Sep. 27, 2007.
Office Action from U.S. Appl. No. 10/816,228 dated Mar. 31, 2006.
*International Search Report and Written Opinion*, PCT/US04/24330, mail date Jun. 27, 2006.
Office Action from U.S. Appl. No. 10/901,919 dated Oct. 19, 2007.
*International Search Report*, PCT/US2004/003054, WO2004070433A3, mail date Aug. 19, 2004.
*International Preliminary Report on Patentability*, PCTUS0438584, mail date Aug. 21, 2006, 1-4.
*International Search Report and Written Opinion*, PCT/US2004/38162, mail date Nov. 30, 2005.
*International Search Report*, PCT/US03/32076, W02004034100, mail date Apr. 20, 2004.
Office Action from U.S. Appl. No. 10/851,471 dated Mar. 27, 2006.
Office Action from U.S. Appl. No. 10/461,557 dated Feb. 10, 2005.
Interview Summary from U.S. Appl. No. 10/461,557 dated Aug. 5, 2005.
Notice of Allowability from U.S. Appl. No. 10/461,557 dated Jan. 10, 2006.
*International Search Report and Written Opinion of the International Searching Authority* for PCT/US07/073530 mailed Mar. 7, 2008.
*International Search Report and Written Opinion of the International Searching Authority* for PCT/US07/75780 mailed Mar. 27, 2008.
Notice of Allowance for U.S. Appl. No. 12/119,039 mailed Dec. 19, 2008.
International Search Report for PCTUS0414938 mailed May 26, 2005.
"Hyper ARGUS LED, Hyper-Bright 3mm LED, Non Diffused", *Infineon Technologies* Mar. 1, 2000, 1-9.
Benitez, Pablo, "U.S. Appl. No. 10/269,479", filed Oct. 11, 2002.
Benitez, Pablo, "U.S. Appl. No. 10/779,259", filed Feb. 13, 2004.
Benitez, Pablo, "U.S. Appl. No. 10/880,386", filed Jun. 28, 2004.
Benitez, Pablo, "U.S. Appl. No. 10/901,919", filed Jul. 28, 2004.
Benitez, P., "Chapter 6: The SMS Design Method in Three Dimensions", *Conceptos avanzados de optica anidolica: diseno y fabricacion, PhD dissertation, UPM* (1998).
Benitez, P., "Design in 3D Geometry with the Simultaneous Multiple Surface design method of Nonimaging Optics", *Instituto de Engergia Solar, E.T.S.I. Telecommunicacion, Universidad Politecnica*, 28040. Madrid, spin Jul. 26, 2004.
Chavez, Julio C., "U.S. Appl. No. 10/816,228", filed Mar. 31, 2004.
European Search Report, *Supplementary European Search Report from EP04752067* mailed May 9, 2008.
Eurpoean Patent Office, *Examination Report for EP Application No. 04750671* mailed Aug. 28, 2008.
Falicoff, Waqidi , "U.S. Appl. No. 10/903,925", filed Jul. 29, 2004.
Glaeser, Georg, "Reflections on Refraction", *AMS* Sep. 5, 2001, 1-18.
Int'l Searching Authority, *International Search Report and Written Opinion of the International Searching Authority* for PCTUS0629464 mailed Jun. 19, 2008.

Int'l Searching Authority, *International Search Report and Written Opinion of the International Searching Authority* for PCTUS0775779 mailed Jul. 24, 2008.

Minano, Juan , "U.S. Appl. No. 10/622,874", filed Jul. 18, 2003.

Minano, Juan C., "U.S. Appl. No. 10/772,088", filed Feb. 3, 2004.

Minano, Juan C., "U.S. Appl. No. 10/987,182", filed Nov. 12, 2004.

Minano, Juan C., "U.S. Appl. No. 11/040,506", filed Jan. 21, 2005.

Minano, "U.S. Appl. No. 12/119,039", filed May 2, 2008.

Parkyn, William A., "U.S. Appl. No. 10/851,471" , filed May 21, 2004.

Parkyn, "The Black Hole: Cuspated waveguide-injectors and illuminators for LEDs", *Part of the SPIE Conference on Nonimagino Optics: Maximum Efficiency Light Transfer V*, Denver, CO Jul. 1999.

Remillard, et al., "Loss Mechanisms Optical Light Pipes", *Applied Optics*, vol. 31 #34 Dec. 1992, 7232-7241.

Spigulis, "Compact Dielectric reflective elements, Half Sphere concentrators of radially emitted light", *Applied Optics* vol. 33 Nov. 25, 1994.

Notice of Allowance for U.S. Appl. No. 10/901,919 mailed Jun. 16, 2008.

Examiner Interview for U.S. Appl. No. 10/901,919 mailed Jan. 23, 2008.

Winston, Roland et al., "NonImaging Optics", *Elsevier Academic Press*, Burlington, MA, USA, Copyright 2005.

Yupin, Sun, "U.S. Appl. No. 10/726,130", filed Dec. 1, 2003.

LED LUMINANCE-ENHANCEMENT AND COLOR-MIXING BY ROTATIONALLY MULTIPLEXED BEAM-COMBINING

PRIORITY CLAIM

This application is a Continuation of International Patent Application No. PCT/US07/75780 filed Aug. 13, 2007, entitled LED LUMINANCE-ENHANCEMENT AND COLOR-MIXING BY ROTATIONALLY MULTIPLEXED BEAM-COMBINING, which claims the benefit of U.S. Provisional Application No. 60/822,209, filed Aug. 11, 2006, entitled LED LUMINANCE-ENHANCEMENT AND COLOR-MIXING BY ROTATIONALLY MULTIPLEXED BEAM-COMBINING, both of which are incorporated herein by reference in their entireties.

FIELD OF THE INVENTION

The present invention relates to enhancing luminance, and more particularly to luminance enhancement and color mixing.

BACKGROUND

The use of light emitting diodes (LED) has increased dramatically over the last few decades. Numerous applications for LEDs have been identified and continue to be identified.

LEDs alone typically emitted relatively low light emissions as compared with many other types of light sources. As a result, the use of LEDs for some implementations has been limited.

SUMMARY OF THE EMBODIMENTS

The present invention advantageously addresses the needs above as well as other needs through the provision of the methods and systems for use in providing enhanced illumination. Some embodiments provide lighting systems. These systems comprises at least two light sources and one or more smoothly rotating wheels, said one or more wheels comprising at least one mirror sector, the circumferential portion of said mirror sector being the inverse of the number of said sources, a first source of said at least two sources is so disposed that said mirror sector reflects light from the first source into a common output path, said first source pulsing such that a duty cycle of the first source corresponds to a time said mirror sector reflects light from the first source into said common output path.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF EMBODIMENTS

In spite of decades of progress in making LEDs brighter, there are still light sources that greatly outshine them, such as HID filaments and arc lamps. LED luminance is typically limited by the LED chip's maximum operating temperature, which often will be exceeded unless cooling means match the chip's heat load. When input current is pulsed and heat load is intermittent, higher luminance can be temporarily attained. This effect is limited in many blue and green chips to only about a 50-100% increase. Some present embodiments provide methods to in part pulse multiple chips out of phase, to have their output combined into a temporally constant light with enhanced luminance.

Another problem with LEDs is color mixing while retaining the high luminance of the individual chips. The typical RGB LED configuration has three LED chips situated side-by-side in a diffusive medium that mixes the colors over a much larger emission area than that of the three chips. Some present embodiments in part overlay the separate chips into a common output. Conventional dichroic mirrors can do this, but generally only for collimated light and only for LEDs having spectra without substantial overlap. This typically precludes the addition of more colors to an illuminant to improve its gamut and its color rendering over the standard three.

Some systems utilize a rotating fold mirror to reflect successive radially ingoing collimated beams, down a rotational axis to a single receiver. One potential drawback with this approach is the requirement for a very rapid stepper motor to quickly rotate between the different incoming beams and then stop rotating for the on-time each is allotted. An ordinary rotating mirror is typically not possible because of the very short dwell time of each input beam to fully occupy the output beam.

Some present embodiments utilize a smoothly rotating mirror that generally limit and in some instances substantially alleviate inevitable vibrations produced by the rapid and intermittent rotations of a stepper motor and a scan mirror.

Another problem in putting the light onto a rotational axis of a scanning mirror makes the system sensitive to errors in its tilt or centering relative to the axis, which could occur during assembly and/or develop over time due to the inherently high vibration levels from stepper motors. Also, a stepper motor typically has very high torque, increasing its size and the weight of the support structure. Some present embodiments alleviate these shortcomings utilizing rotation of a sectored mirror, array of lenses, and/or combinations thereof.

Further, some present embodiments provide temporal mixing of the light from multiple light-emitting diodes that are intermittently pulsing with out-of-phase duty cycles. These duty cycles can be short enough to take advantage of initially high efficacy that some LEDs have immediately after power-on. Additionally, some embodiments use smoothly rotating mirror-wheels to interleave beams from different LEDs with sufficiently short on-duration as to have enhanced luminance.

Light emitting diodes typically suffer from rapid non-radiative recombination of electron-hole pairs in the active layer, but millisecond-scale pulses can be used that are short enough that this is not fully in effect. Instead, high transient currents are rewarded with up to double the luminance of steady-state operation. A duty cycle of approximately 25% enables this high luminance to be achieved about a fourth of the time. Some present embodiments enable four such sources to be interleaved into a steady luminance-doubled output.

Figure 1:
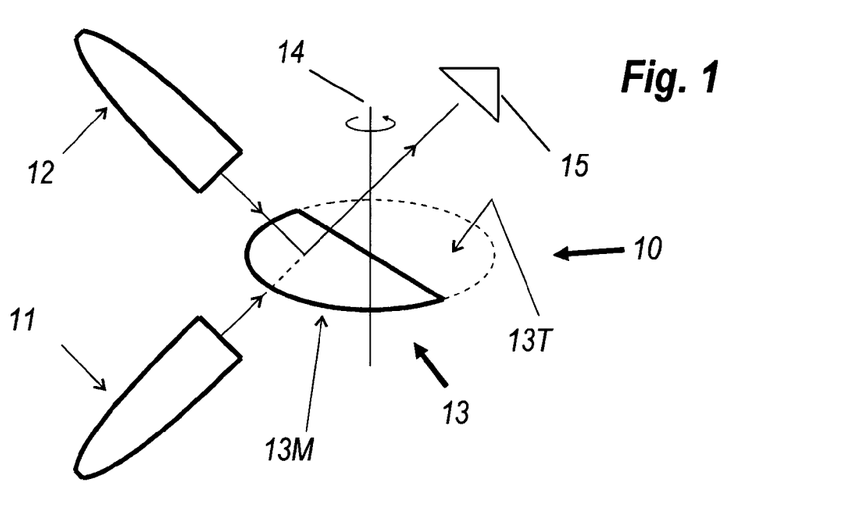
FIG. 1 shows a simplified schematic view of a light system with sectored mirror that alternates two light sources onto a receiver.

FIG. 1 shows a light system 10 the utilizes a sectored mirror 13M that alternately directs light from two light sources 11 and 12 onto a receiver 15, according to some embodiments. Luminance-enhanced light system 10 comprises first collimated light source 11 and second collimated light source 12. Source 11, in some instances, is boresighted directly onto receiver 15, while source 12 is positioned to reflect off of semicircular mirror 13M, which rotates about axis 14. Semicircular transparent sector 13T allows first source 11 to illuminate receiver 15 during half the rotational period of wheel 13. Mirror 13M enables second source 12 to take over for the other half of the period.

Figure 2:
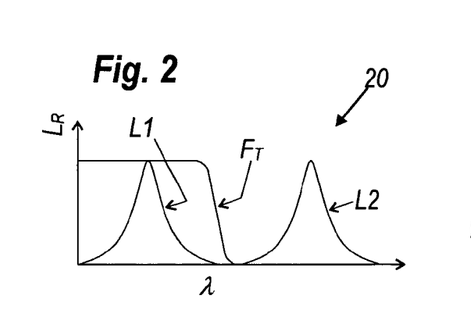
FIG. 2 graphically shows non-overlapping LED spectra.

FIG. 2 depicts a graphical representation of how a dichroic mirror can act upon spectrally separate light beams. Graph 20 has horizontal axis for wavelength λ and vertical axis $L_R$ for normalized spectral intensity. Curves L1 and L2 represent the separate spectra of two LEDs. Curve $F_T$ is the normal-incidence transmittance of a suitable selective filter.

Figure 3:
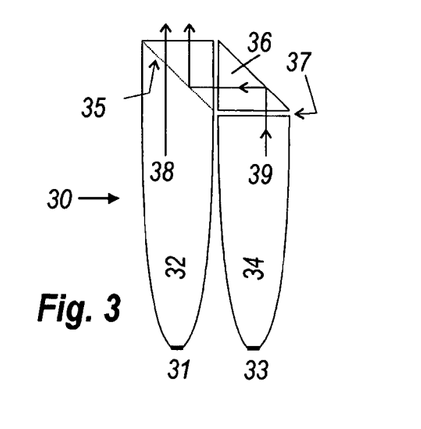
FIG. 3 shows a dichroic-mirror design for overlaying spectra, such as the spectra of FIG. 2.

FIG. 3 shows color mixer 30 comprising first LED 31 and second LED 33, with respective spectra L1 and L2 of FIG. 2. They are optically coupled to collimators 32 and 34, respectively. Dichroic filter 35, with curve $F_T$ of FIG. 2, enables second beam 39 to be overlaid on first beam 38. This method is typically inapplicable in the case of two LEDs with overlapping spectra.

Figure 4:
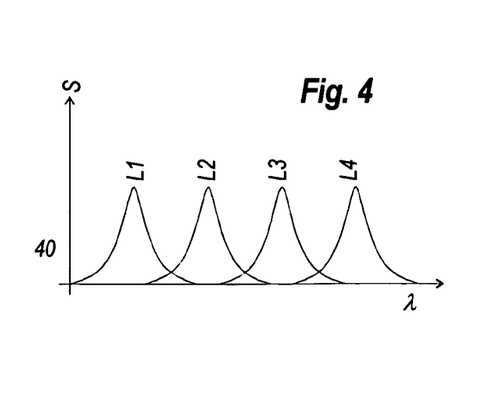
FIG. 4 graphically shows overlapping LED spectra.

FIG. 4 shows graph 40 of relative spectral intensity S as a function of wavelength λ for four overlapping LEDs L1, L2, L3, & L4. The use of dichroic filters would in this case typically entail substantial losses.

Figure 5:
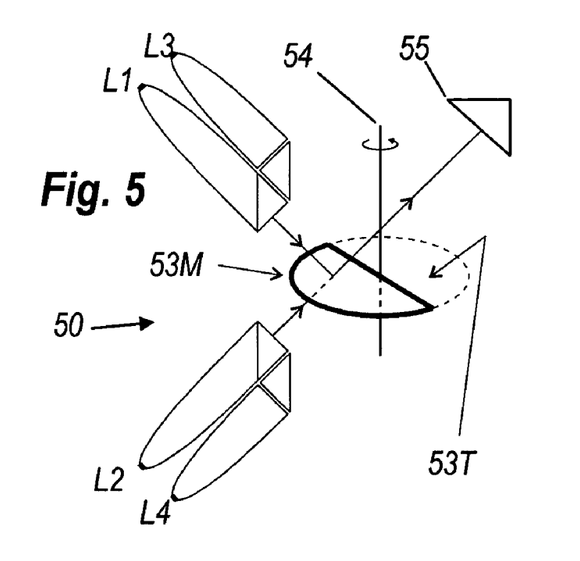
FIG. 5 shows a simplified schematic view of a light system that overlays spectra.

FIG. 5 shows four-LED system 50 with LEDs L1, L2, L3, & L4 having the overlapping spectra shown in FIG. 4. The LEDs are configured as in FIG. 3, with a mirror arrangement including mirror 53M that is the same as the mirror arrangement in FIG. 1.

Figure 6:
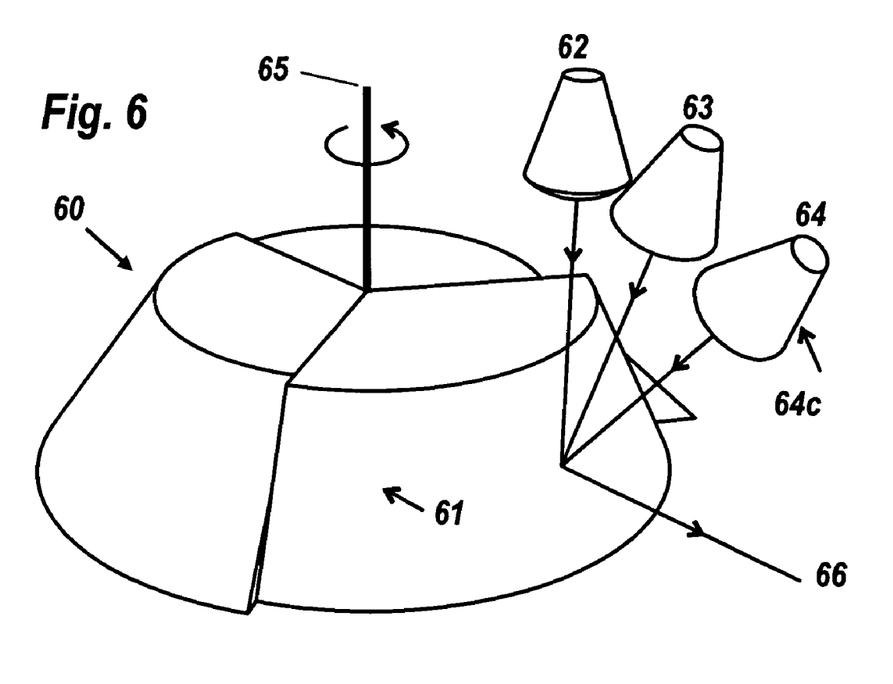
FIG. 6 shows a perspective view of a triconic color wheel.

FIG. 6 shows an alternative mirror wheel design that is multi-conic with multiple sectors that in some embodiments correspond to a number of light sources. System 60 comprises trisectored mirror-wheel 61, and LEDs 62, 63, & 64, each with a collimator as 64c. The three sectors are differently inclined along a perimeter so as to reflect in turn each of the collimator outputs into common output path 66. The mirrors profiles can have many shapes such as flat, spherical or even aspheric to correct the astigmatism caused to the reflected beam. Since those profiles are rotationally symmetric, they remain invariant with the rotation. In some embodiments that may enhance performance, the collimators 64c concentrate the light into a small spot inside the sector, thereby reducing the transition time between outputs from one LED to the next. In some implementations, for example, the system 60 could be the basis for an RGB television illuminator for a digital micromirror device.

The system 60 of FIG. 6 could comprise a different number of sectors (two, four or more) to produce the multiplexing of the corresponding number of light sources.

Alternatively, instead of the mirrors of the system 60 in FIG. 6, a sectored lens-wheel could be used, so the light is transmitted instead of reflected. Another embodiment comprises the combination or refractive and reflective sectors.

Figure 7:
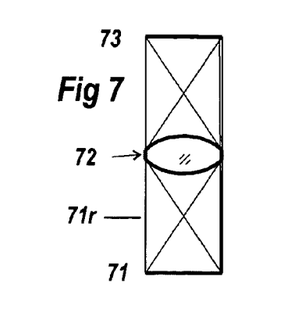
FIG. 7 shows a nonimaging relay lens.

FIG. 7 shows aperture 71 admitting edge rays 71r that are such as to form a tube entirely illuminating nonimaging relay lens 72, which in turn sends the edge rays through second aperture 73. Such a lens enables multiple light sources to be temporally interleaved.

Figure 8A:
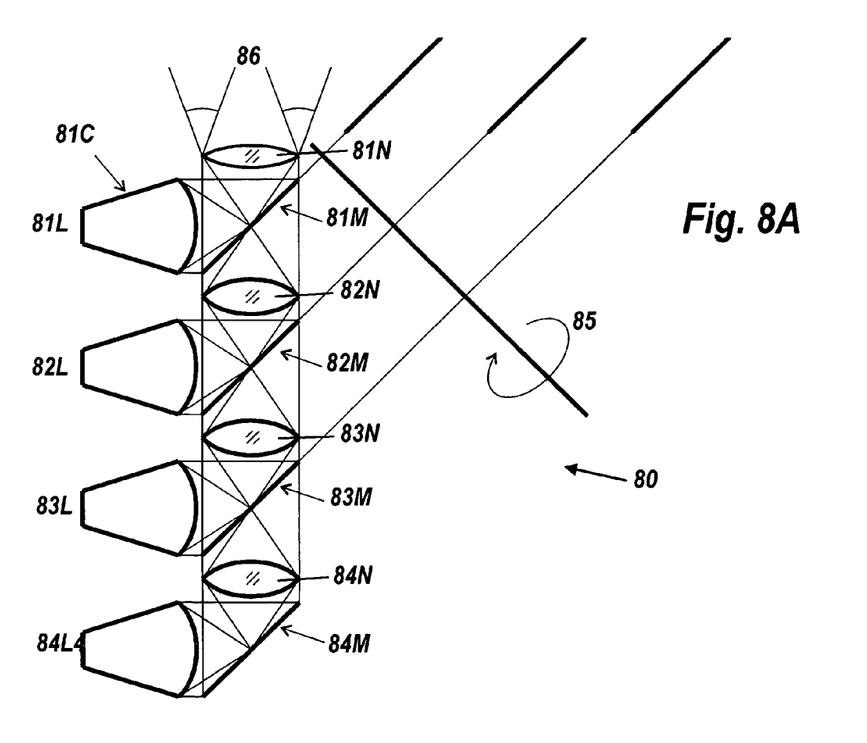
FIG. 8A is a side view of a multi-wheel 4-LED system.

FIG. 8A is a schematic side view of multi-wheel system 80, showing LEDs 81L, 82L, 83L, & 84L coupled to their respective nonimaging collimators 81C, 82C, 83C, & 84C and sectored mirror-wheels 81M, 82M, and 83M, and fixed mirror 84M. The mirror-wheels 81M, 82M, and 83M rotate about common axis 85.

Figure 8B:
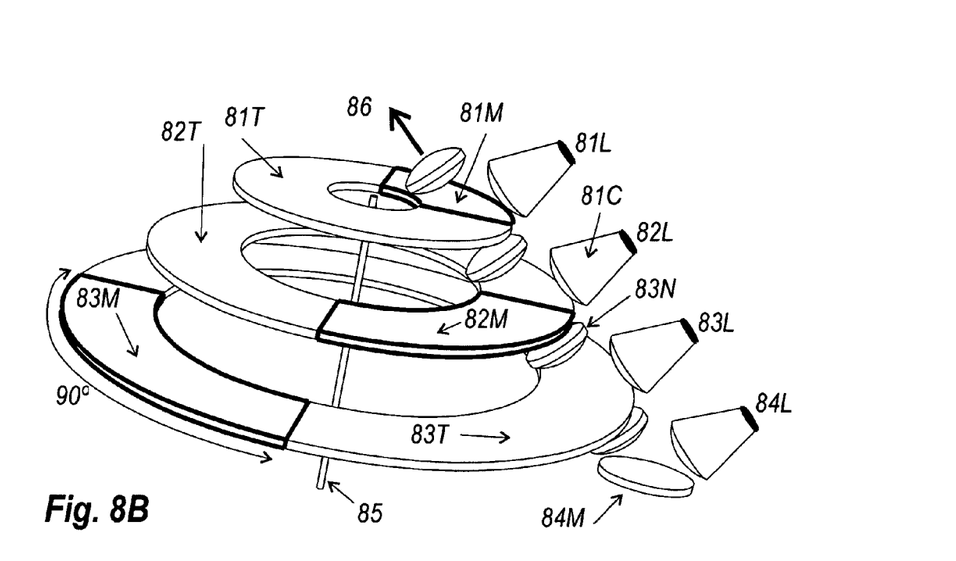
FIG. 8B is a perspective view of the multi-wheel system of FIG. 8A.

FIG. 8B is a perspective view of system 80 showing how the rotation of the sectored mirror-wheels 81M, 82M, and 83M gives the overlaid output. LED 81L is on when mirrored sector 81M is under it. Likewise for LED 82L and mirrored sector 82M, on the next 90° of wheel rotation, and LED 83L and mirrored sector 83M. On the final 90° of rotation, the transparent sectors 81T, 82T, & 83T allow LED 84L to reflect off stationary mirror 84M and pass up through the transparent sectors 81T, 82T, & 83T and the lenses 81N, 82N, 83N and 84N to provide the output beam 86.

Figure 9:
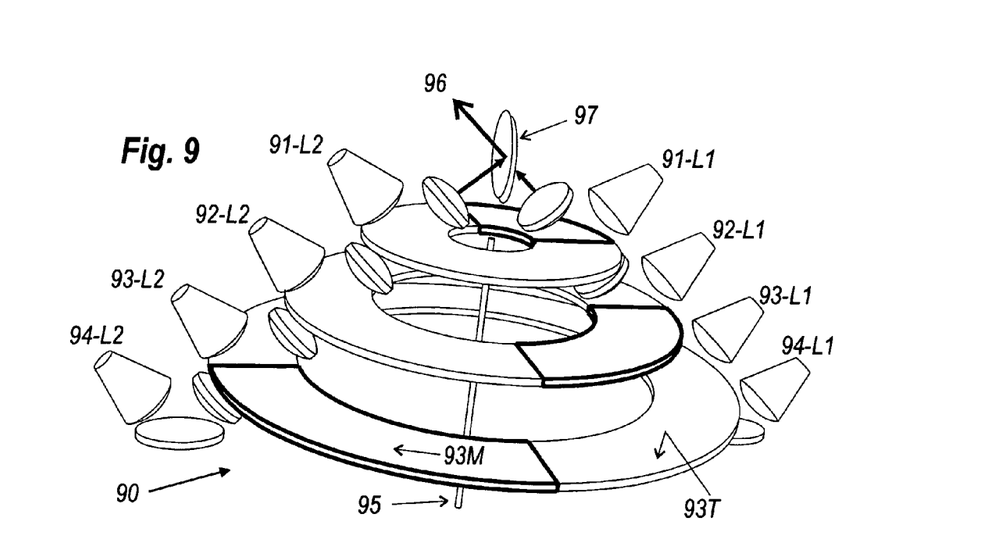
FIG. 9 is a perspective view of a two-color variation of a multi-wheel system according to some embodiments.

FIG. 9 is a perspective view of multi-wheel two-color system 90, according to some embodiments, with color sectored mirror-wheels that are substantially the same as those of FIG. 8B that have mirror sections (e.g., 93M) and the transparent sections (e.g., 93T) and rotate about an axis 95. The two-color system 90 includes a first bank, set or system of LEDs 91-L1, 92-L1, 93-L1 and 94-L1 with an associated system of lenses, a second bank, set or system of LEDs 91-L2, 92-L2, 93-L2 and 94-L2 with an associated system of lenses. The two systems of LEDs and lenses operate 180° out of phase and are overlaid by dichroic mirror 97. The light from both stacks of LEDs comes out as a combined output 96.

Figure 10:
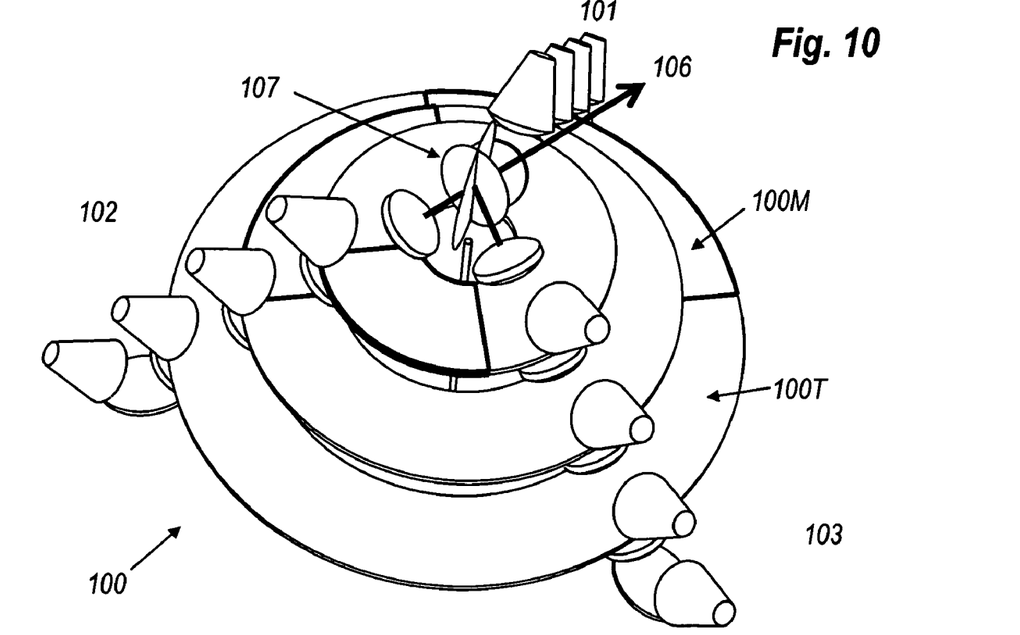
FIG. 10 is a perspective view of a three-color view of a multi-wheel system according to some embodiments.

FIG. 10 shows three-color system 100. The three-color system 100 includes three sectored mirror-wheels each with mirrored sections (e.g., 100M) and optically transparent sections (e.g., 100T) at least for the wavelengths of light emitted from the respective LEDs. The three-color system 100 further includes dual dichroic mirrors 107 forming common output beam 106 from three LEDs and associated lens systems 101, 102 and 103.

Figure 11:
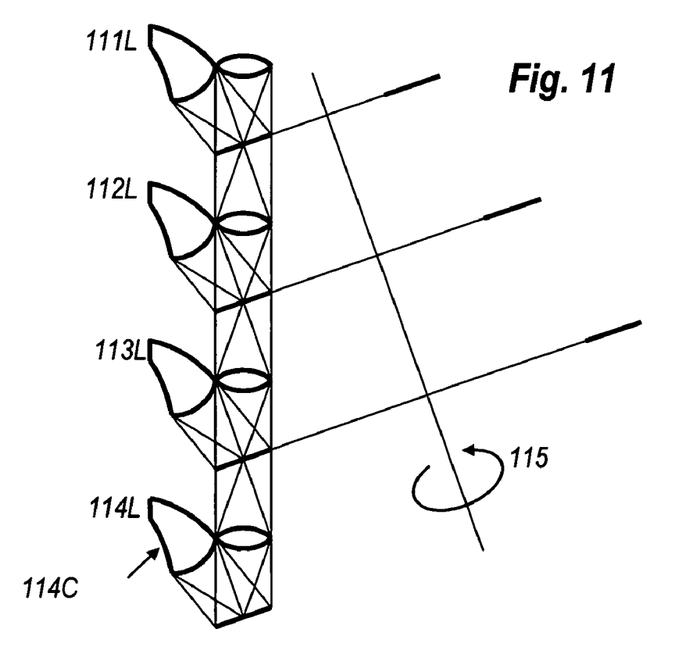
FIG. 11 is a side view of a more compact version of a multi-wheel system according to some embodiments.

FIG. 11 shows a side view of a multi-wheel system according to some embodiments that is more compact than the system of, for example, FIGS. 8A and 8B. The system includes LED sources 11L, 112L, 113L and 114L with associated lenses 114C, and sectored mirror-wheels that rotate about an axis 115. The system of FIG. 11, in part, shows how the larger wheels of, for example, FIGS. 8A and 8B can be made smaller, utilizing more compact collimators having a different optical architecture.

The present embodiments provide methods, systems and apparatuses for use in enhancing light and/or mixing light. Some embodiments provide multiple LED systems that interleave phased pulses through the use of a sectored mirror wheel that is smoothly rotating. Rapid rotational rates are utilized in at least some embodiments that give short pulse times that enable enhanced luminance to be attained. Multiple wavelengths can also be interleaved. Further, some embodiments provide spot-focusing that can minimize the transition time between phases. Some embodiments provide color mixing, enhanced luminance and/or both color mixing and enhanced doubled luminance are attained. For example, some embodiments provide a doubling of luminance.

While the invention herein disclosed has been described by means of specific embodiments and applications thereof, numerous modifications and variations could be made thereto by those skilled in the art without departing from the scope of the invention set forth in the claims.

What is claimed is:

1. A lighting system comprising at least two light sources and one or more smoothly rotating wheels, said one or more wheels comprising at least one mirror sector, the circumferential portion of said mirror sector being the inverse of the number of said sources, a first source of said at least two sources is so disposed that said mirror sector reflects light from the first source into a common output path, said first source pulsing such that a duty cycle of the first source corresponds to a time said mirror sector reflects light from the first source into said common output path.

2. The system of claim 1 wherein said light sources are collimated.

3. The system of claim 1 wherein said at least two light sources are focused to a spot on a corresponding mirror sector of said at least one mirror sector of said one or more wheels.

4. The system of claim 3 wherein said one or more wheels comprises multiple wheels each receiving one or more of said spots of said focusing light from said light sources, and further comprising relay lenses so disposed with one of said relay lenses positioned between said multiple wheels as to reimage each spot to a next successive wheel of the multiple wheels.

5. The system of claim 1 wherein said wheel is planar and said mirror sector is generally pie-shaped portion thereof, and said wheel comprises a transparent sector that is pie-shaped.

6. The system of claim 1 wherein said wheel is multi-conic with multiple mirror sectors, and said multiple mirror sectors are sectors of cones of differing slope.

7. The system of claim 6, wherein the multiple mirror sectors comprises a number of mirror sectors equal to the number of said sources with said slope of each of said number of mirror sectors being configured to reflect light from a corresponding light source into said common output path.

8. The system of claim 1 further comprising a plurality of banks of light sources, each said bank of light sources producing a spectrum substantially distinct from each of the other banks of light sources.

9. The system of claim 8 also comprising one or more dichroic mixing mirrors that is positioned to combine respectively two or more of said plurality of banks of light sources producing the substantially distinct spectra.

* * * * *